US006807247B2

(12) United States Patent
Krishnan et al.

(10) Patent No.: US 6,807,247 B2
(45) Date of Patent: Oct. 19, 2004

(54) VISUALIZATION OF VOLUME—VOLUME FUSION

(75) Inventors: Arun Krishnan, Exton, PA (US); Steven Charles Dilliplane, Yardley, PA (US); Jens Guehring, Monmouth Junction, NJ (US); Ramamani Ramraj, Dayton, NJ (US); Juergen Soldner, Knoxville, TN (US)

(73) Assignee: Siemens Corporate Research, Inc., Princeton, NJ (US)

(*) Notice: Subject to any disclaimer, the term of this patent is extended or adjusted under 35 U.S.C. 154(b) by 0 days.

(21) Appl. No.: 10/382,008

(22) Filed: Mar. 5, 2003

(65) Prior Publication Data

US 2004/0013290 A1 Jan. 22, 2004

Related U.S. Application Data

(60) Provisional application No. 60/362,014, filed on Mar. 6, 2002.

(51) Int. Cl.[7] .............................................. A61B 6/03
(52) U.S. Cl. ...................... 378/4; 378/901; 250/363.04
(58) Field of Search ......................... 378/4, 8, 15, 901; 250/363.04, 370.08, 370.09

(56) References Cited

U.S. PATENT DOCUMENTS

| | | |
|---|---|---|
| 5,398,684 A | 3/1995 | Hardy |
| 5,961,454 A | 10/1999 | Kooy et al. ................. 600/407 |
| 6,303,935 B1 | 10/2001 | Engdahl et al. ........ 250/363.03 |
| 6,480,732 B1 | 11/2002 | Tanaka et al. |
| 6,490,476 B1 * | 12/2002 | Townsend et al. .......... 600/427 |

FOREIGN PATENT DOCUMENTS

US  WO9632065  10/1996

OTHER PUBLICATIONS

Beyer et al: "A combined PET/CT Scanner For Clinical Oncology" Journal of Nuclear Medicine. New York, US, vol. 41, No. 8, Aug. 2000, ISSN: 0161–5505 abstract p. 4, left–hand column, line 1–line 3 figure 5.
Rizzo G. et al.: "Integration of cupet images for the optimization of radiotherapy planning" proceedings of the $23^{rd}$. Annual International Conference of the IEEE Engineering in the Medicine and Biology Society. 2001 Conference Proceedings. (EMBS). Instanbul, Turkey, Oct. 25–28, 2001, Annual International Conference of the IEEE Engineering in M, vol. 1 of 4 Conf. 23, Oct. 25, 2001, pp. 2756–2758, XP010592231 ISBN: 0–7803–7211–5 abstract p. 2756, right–hand column, line 22– line 28.
Hai–Ping Ren et al: "Multi–resolution three–dimensional multi–modality image registration by maximization of mutual information" Proceedings of the $23^{rd}$. Annual International Conference of the IEEE Engineering in Medicine and Biology (EMBS). Instanbul, Turkey, Oct. 25–28, 2001, Annual International Conference of the IEEE Engineering in M, vol. 1 of 4 Conf. 23, Oct. 25, 2001, pp. 2756–2758, XP010592231 ISBN: 0–7803–7211–5 abstract p. 2411, left–hand column, line 26– line 30.

* cited by examiner

*Primary Examiner*—David V Bruce
(74) *Attorney, Agent, or Firm*—Donald B. Paschburg; F. Chau & Associates, LLP

(57) ABSTRACT

The present invention provides techniques for combining various types of diagnostic images. In one embodiment of the present invention, a composite image is obtained by fusing MPR and MIP images. The MPR is obtained from a CT scan, and the MIP is obtained from a PET scan. The resulting superimposed images help a physician to see the diagnostic information in context. In other embodiments of the present invention, techniques for an MIP-MIP overlay, VR-MIP overlay, and VR-MPR overlay are provided.

21 Claims, 5 Drawing Sheets

VISUALIZATION OF VOLUME— VOLUME FUSION

CROSS REFERENCE TO RELATED APPLICATIONS

This application claims the benefit of U.S. Provisional Application Ser. No. 60/362,014, filed on Mar. 6, 2002, which is incorporated by reference herein in its entirety.

FIELD OF THE INVENTION

The present invention relates generally to medical imaging, and, more particularly to techniques for visualization of various types of volume-volume fusion.

BACKGROUND OF THE INVENTION

It is often desirable to combine medical images. Consider for example, fusion between positron emission tomography (PET) and computed tomography (CT) volumes. The PET volume voxel values measure the functional aspect of the examination, typically, the amount of metabolic activity. The CT volume voxel values indicate the X-ray absorption of the underlying tissue and therefore show the anatomic structure of the patient. A multi-planer reformat (MPR) cross-sectional view of a PET volume typically looks somewhat like a noisy and low-resolution version of the corresponding MPR cross-section from the CT volume. However, what a user is usually most interested in seeing are the high intensity values from the PET volume, and seeing where these "hot-spots" are located within the underlying anatomical structure that is clearly visible in the CT volume.

A conventional MPR-MPR fusion only allows a user to see the relationship between the two volumes, a cross-section at a time. Thus, the user must look at all the cross-sections to understand the relationship fully. This is both time-consuming and prone to error.

Given the importance of providing useful visualization information, it would be desirable and highly advantageous to provide new techniques for visualization of a volume-volume fusion that overcome the drawbacks of the prior art.

SUMMARY OF THE INVENTION

The present invention provides techniques for combining various types of diagnostic images to allow a user to view more useful information. In one embodiment of the present invention, a composite image is obtained by fusing MPR and maximum intensity projection (MIP) images or minimum intensity projection (MinIP) images. The MPR image is obtained from a CT scan, and the MIP image is obtained from a PET scan. The resulting superimposed images help a physician to see the diagnostic information in context. In other embodiments of the present invention, techniques for an MIP-MIP overlay, volume rendering (VR)-MIP overlay, and VR-MPR overlay are provided.

A system for visualizing a volume-volume fusion comprises a projector for creating a projected image using a first volume, a reformatter for creating a planar representation image using a second volume, and a combiner for fusing the projected image and the planar representation image, to create a composite image.

Alternatively, the system for visualizing a volume-volume fusion, comprises a first projector for creating a first projected image using a first volume, a second projector for creating a second projected image using a second volume, and a combiner for fusing the first projected image and the second projected image, to create a composite image.

In addition, a method for visualizing a volume-volume fusion, comprises creating a first image using a first volume, creating a second image using a second volume, the second image a projected image, and combining the first image and the second image, to create a composite image.

These and other aspects, features and advantages of the present invention will become apparent from the following detailed description of preferred embodiments, which is to be read in connection with the accompanying drawings.

DESCRIPTION OF THE PREFERRED EMBODIMENTS

It is also to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or combination thereof) which is executed via the operating system. In addition, various other peripheral devices may be connected to the computer platform such as an additional data storage device and a printing device.

It is to be understood that, because some of the constituent system components and method steps depicted in the accompanying figures are preferably implemented in software, the actual connections between the system components (or the process steps) may differ depending upon the manner in which the present invention is programmed.

Figure 1:
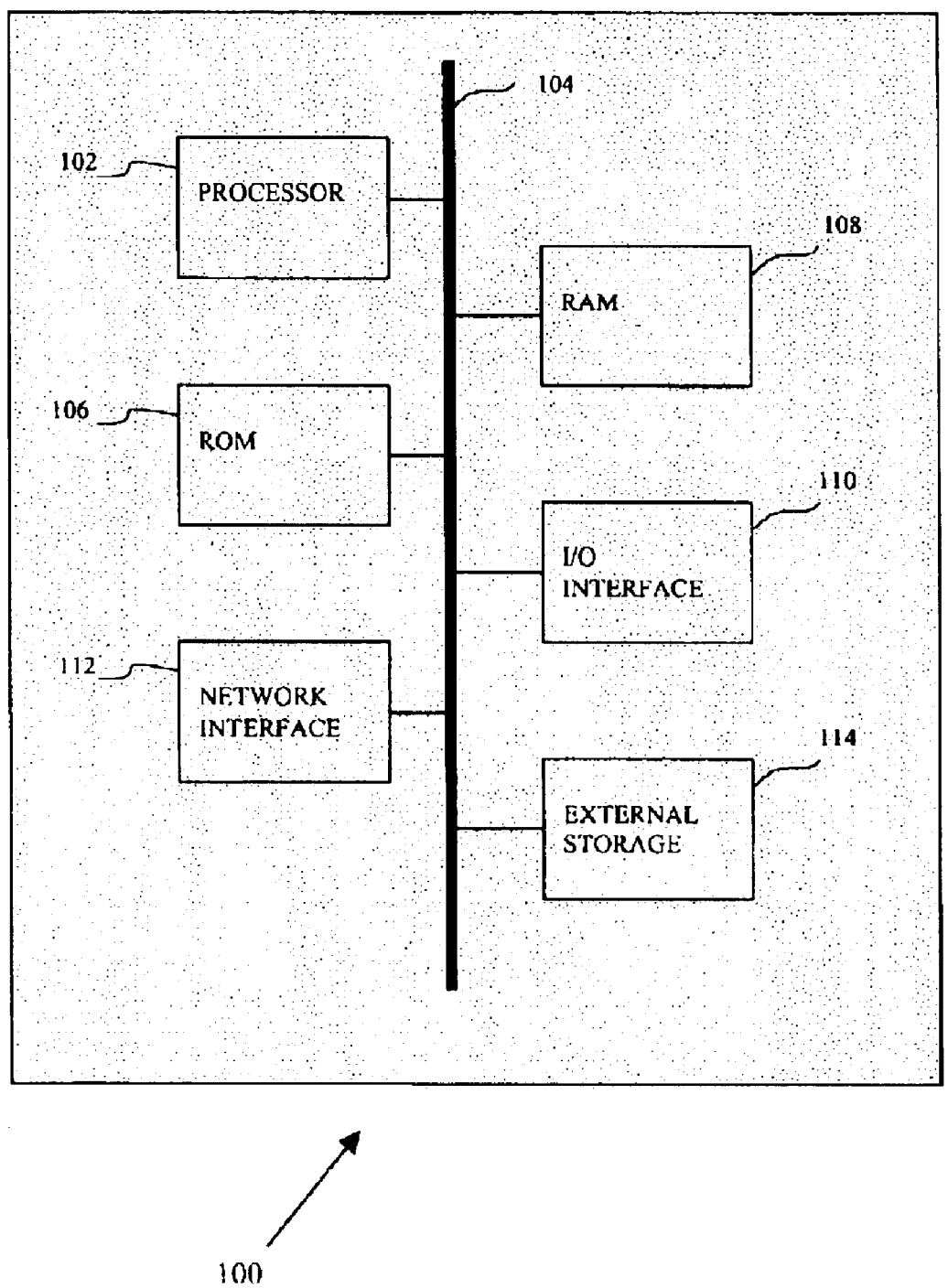
FIG. 1 is a block diagram of a computer processing system to which the present invention may be applied.

FIG. 1 is a block diagram of a computer processing system 100 to which the present invention may be applied according to an embodiment of the present invention. The system 100 includes at least one processor (hereinafter processor) 102 operatively coupled to other components via a system bus 104. A read-only memory (ROM) 106, a random access memory (RAM) 108, an I/O interface 110, a network interface 112, and external storage 114 are operatively coupled to the system bus 104. Various peripheral devices such as, for example, a display device, a disk storage device(e.g., a magnetic or optical disk storage device), a keyboard, and a mouse, may be operatively coupled to the system bus 104 by the I/O interface 110 or the network interface 112.

The computer system 100 may be a standalone workstation or be linked to a network via the network interface 112. The network interface 112 may be a hard-wired interface.

However, in various exemplary embodiments, the network interface 112 can include any device suitable to transmit information to and from another device, such as a universal asynchronous receiver/transmitter (UART), a parallel digital interface, a software interface or any combination of known or later developed software and hardware. The network interface may be linked to various types of networks, including a local area network (LAN), a wide area network (WAN), an intranet, a virtual private network (VPN), and the Internet.

Those skilled in the art will appreciate that other alternative computing environments may be used.

Figure 2:
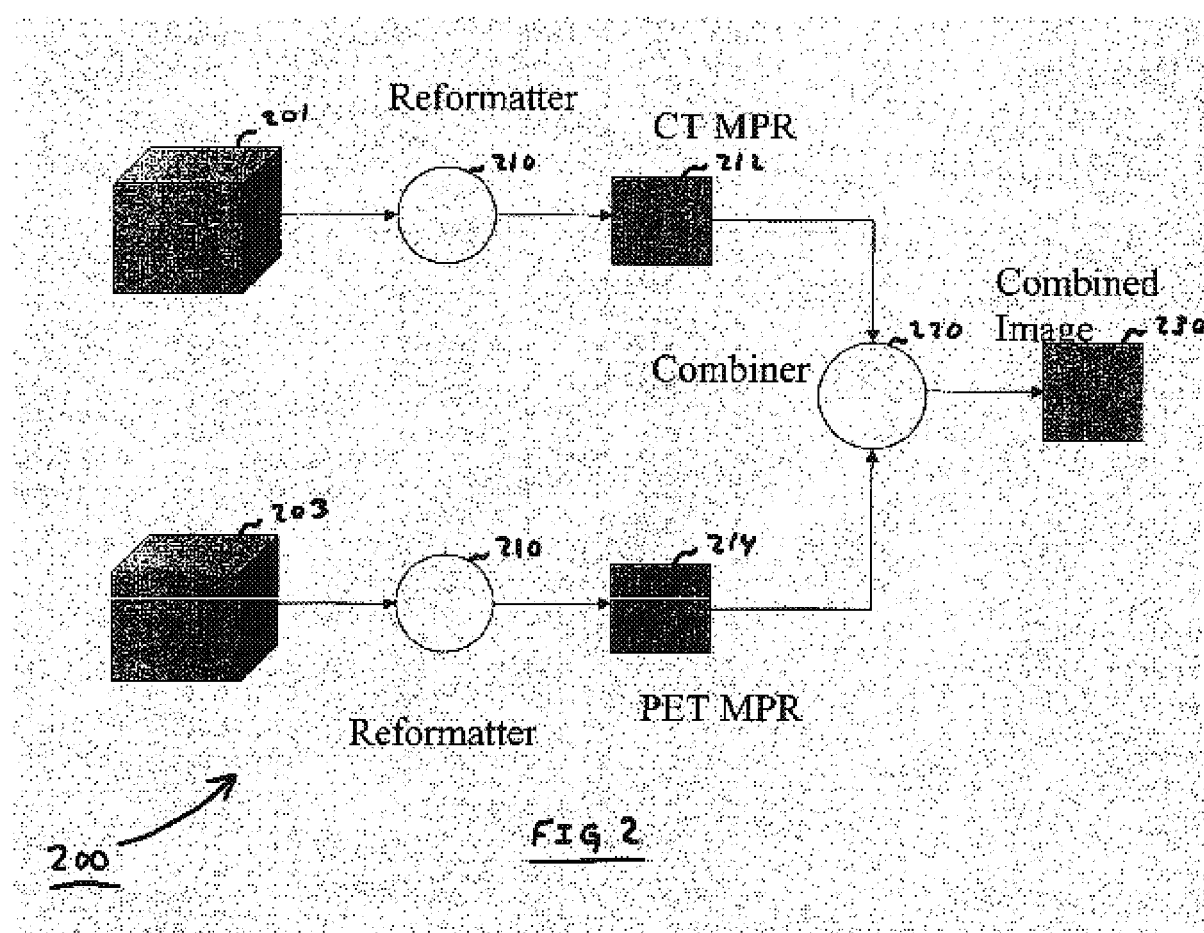
FIG. 2 illustrates a conventional system for an MPR-MPR overlay.

Referring to FIG. 2, a conventional system 200 for an MPR-MPR overlay is illustrated. The conventional system 200 inputs one or more datasets, such as CT volume 201 and PET volume 203, and employs reformatters 210 for the CT volume 201 and the PET volume 203, to obtain cross-sections from these volumes. Results of the reformattings can be stored in storage media (CT MPR 212 and PET MPR 214). A combiner 220 then fuses the reformatted volumes to obtain a combined image 230. This approach assumes that the CT volume 201 and the PET volume 203 were obtained from the patient simultaneously, for example, by using a Biograph™, available from Siemens Corporation. In the case where the volumes are not taken together (e.g., they were taken by separate scanning devices), registration parameters must be determined so that the volumes can be properly aligned.

Registration is the process that allows determination for any point in an object, the corresponding value for each of different datasets. Fusion of datasets involves determining the registration (rigid or non-rigid) that aligns the datasets together. The composite-dataset can then be visualized.

If the datasets are two-dimensional (2D) images, then the typical approaches in the fusion of the composite 2D image are (1) Checker Board Pattern: The composite image is divided into sub-regions, usually rectangles. If one sub-region is taken from one dataset, the next sub-region is taken from the other dataset, and so on. By looking at the boundaries between the sub-regions, the user can evaluate the accuracy of the match. (2) Image Blending: Each pixel in the composite image is created as a weighted sum of the pixels from the individual images. The user evaluates the registration by varying the weights and seeing how the features shift when going from only the first image to viewing the blended image, to viewing only the second image. (3) Pixel Replacement: The composite image is initially a copy of one of the input images. A set of possibly non-contiguous pixels is selected from the other image and inserted into the composite image. Typically, the selection of the set of replacement pixels is done using intensity thresholding. The user evaluates the registration by varying the threshold.

When the datasets are three-dimensional (3D) volumes, the typical approaches to visualization are MPR-MPR, which involves taking a MPR plane through one volume and the corresponding plane through the other volume, and using one of the 2D-2D methods described above. Another approach involves replacement of voxels. This approach is similar to replacement of pixels.

In the conventional system 200 for an MPR-MPR overlay, the combination can include checkerboard pattern, pixel replacement, and blending. Any of these methods (or another suitable method) may be used to create the combined image 230.

Figure 3:
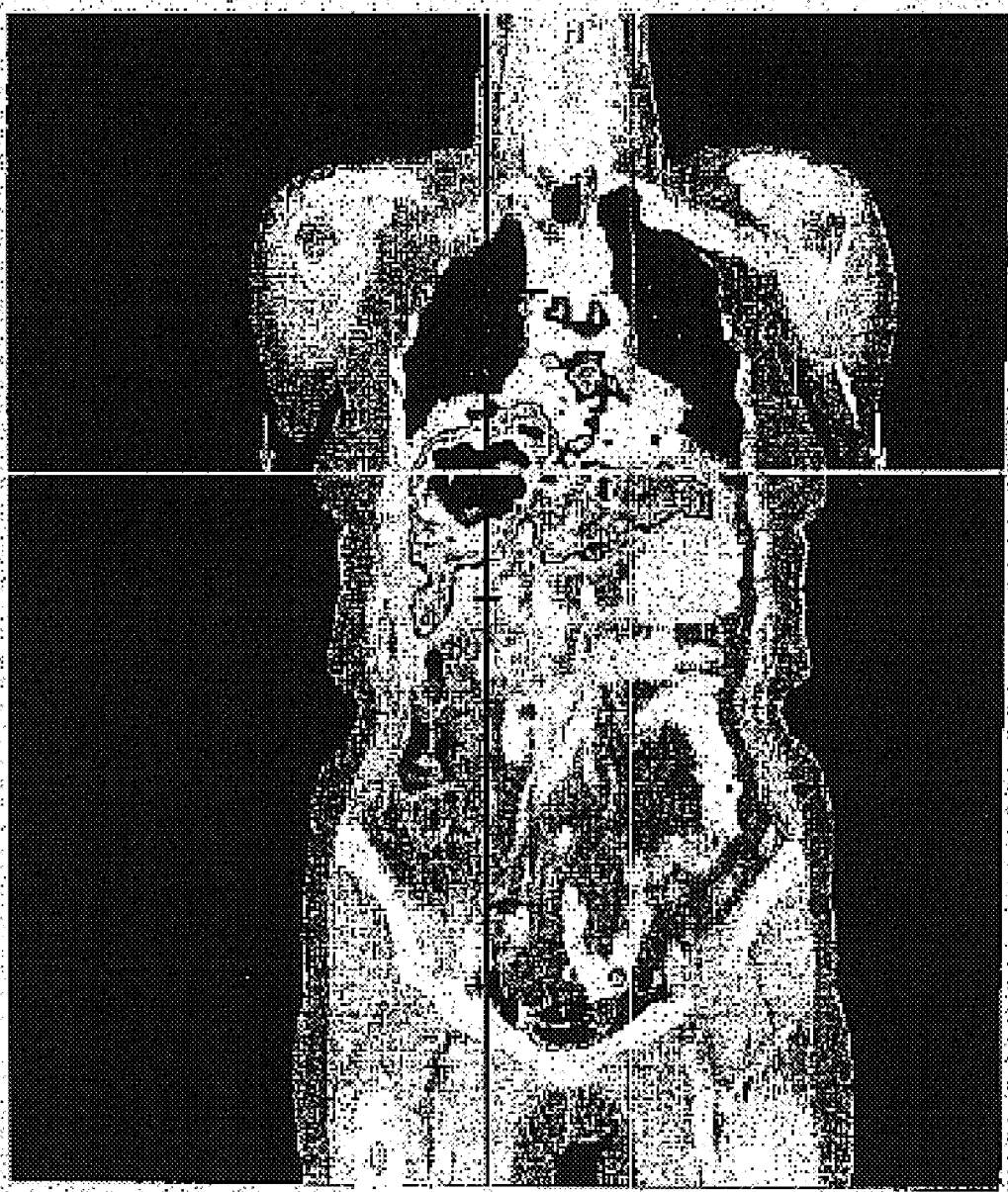
FIG. 3 illustrates an example of applying the conventional system for an MPR-MPR overlay shown in FIG. 2.

FIG. 3 illustrates an example of a result of applying the conventional system 200 for a merge of an MPR of a CT volume and an MPR of a PET volume. In this example, the user is able to see information from the PET scan in context with the patient's anatomical structure obtained from the CT scan.

Figure 4:
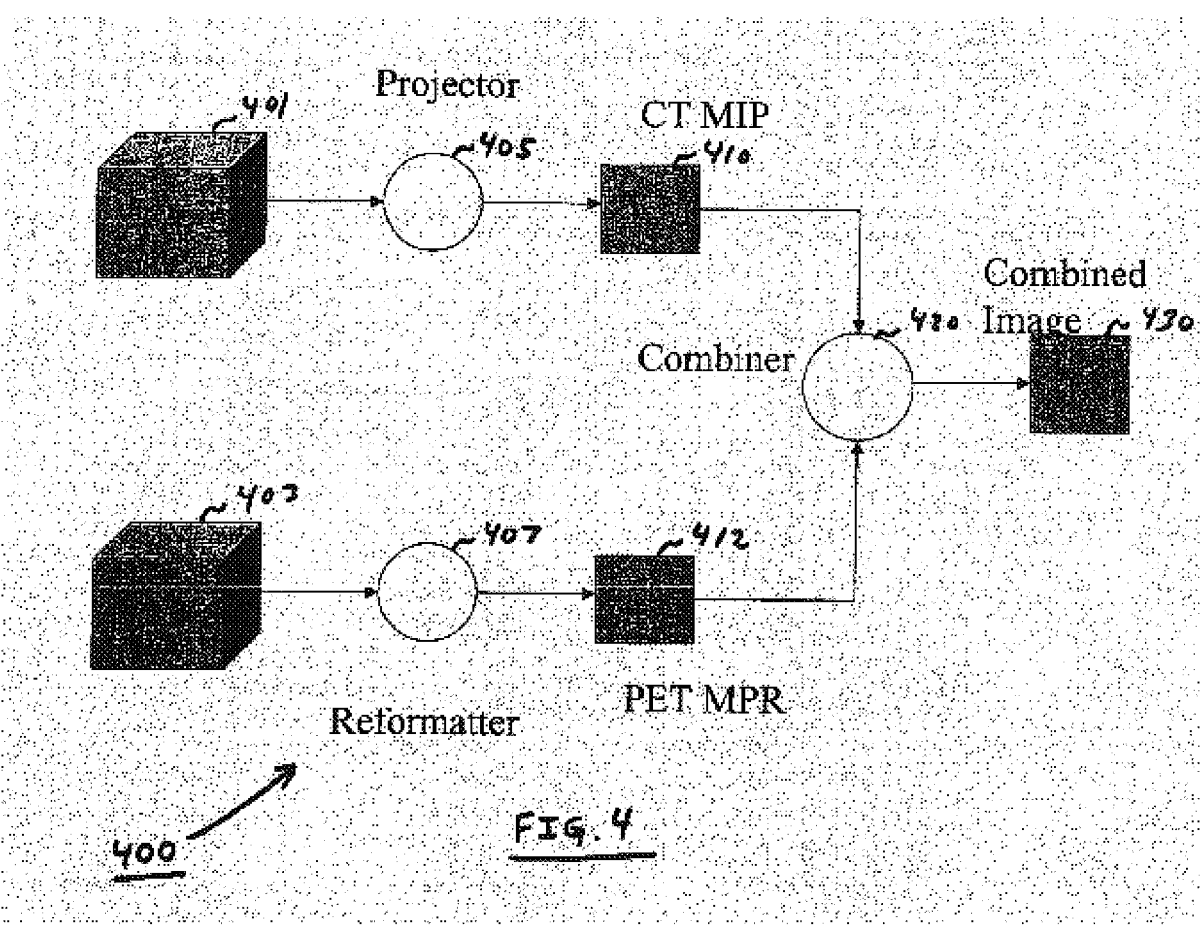
FIG. 4 illustrates an exemplary system for an MPR-MIP overlay.

Referring to FIG. 4, an exemplary system for achieving an MPR-MIP overlay is shown. As illustrated, a system 400 for an MPR-MIP overlay includes one or more datasets, such as CT volume 401 and PET volume 403. These volumes would have been obtained from scanning a patient in a CT scanning device and a PET scanning device, respectively. This approach assumes that the CT volume 401 and the PET volume 403 were simultaneously obtained from the patient, for example, by using a Biograph™. As before, where the volumes are not taken together, the registration parameters must be determined so that the volumes can be properly aligned.

A projector 405 creates a CT MIP 410 from selected portions of the CT volume 401. For example, a user may request that only the skeletal portion of a patient be projected. In general, any suitable MIP algorithm may be used. See, for example, M. Sanka & J. M. Fitzpatrick, Handbook of Medical Imaging, Volume 2, Medical Image Processing and Analysis, pp. 880–886, which is incorporated by reference herein in its entirety.

Next, a reformatter 407 creates a PET MPR 412 from selected portions of the PET volume 403. In general, the reformatter 407 may use any suitable MPR algorithm. Finally, a combiner 420 fuses the CT MIP 410 and the PET MPR 412 to obtain a combined image 430. As discussed above, conventional combination methods include checkerboard pattern, pixel replacement, and blending. Any of these methods, or another suitable method, may be employed. See, for example, T. Porter & T. Duff, Compositing Digital Images, Computer Graphics, Volume 18, Number 3, July 1984, pp. 253–259, which is incorporated by reference herein in its entirety.

Figure 5:
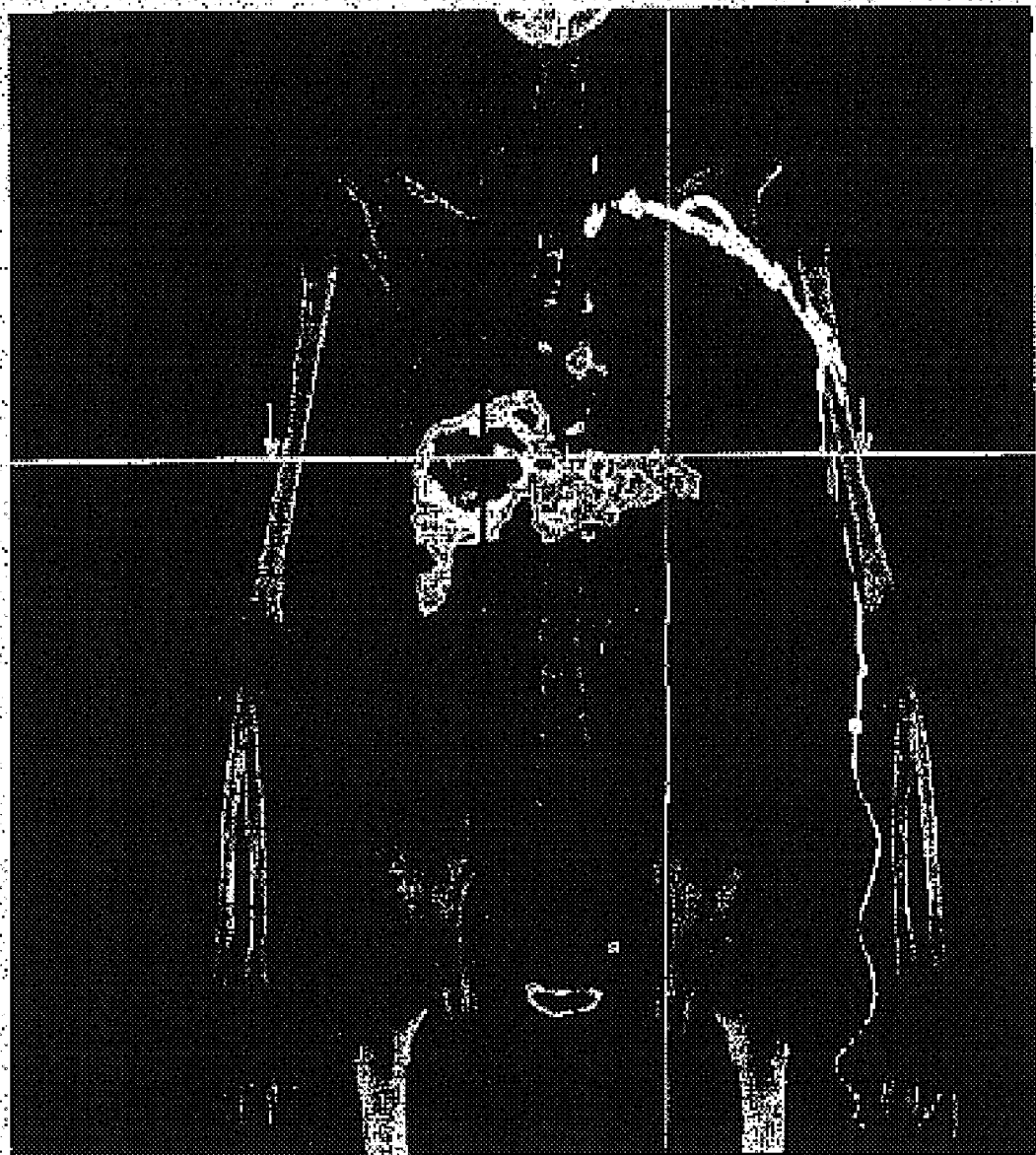
FIG. 5 illustrates an example of applying the system shown for an MPR-MIP overlay in FIG. 4.

FIG. 5 illustrates an example of a result of applying the system 400 for an overlay of an MIP of a CT volume and an MPR of a PET volume. In this example, the user is able to see information from the PET scan in context with the patient's skeleton obtained by the MIP of the CT scan. Advantageously, the user is able to clearly focus only on those aspects of the patient that he or she desires.

Although an exemplary system for achieving an MPR-MIP overlay has been discussed, other embodiments of the present invention comprise techniques for an MIP-MIP overlay, volume rendering (VR)-MIP overlay, and VR-MPR overlay.

For an MIP-MIP overlay, an MIP image of the first volume would be created. Then an MIP image of the second volume with the same projection axis as the first volume would be created. The created images would be fused using one of the 2D-2D methods mentioned above, such as, for example, checker board, pixel replacement, or blending.

For a VR-MIP overlay, a volume rendered image (e.g., using a over-blend operation) would be created from a first volume. Then a MIP image of a second volume from the same view as the first volume would be created. Again, one of the 2D-2D methods would be used.

For a VR-MPR overlay, a volume rendered image of a first volume would be created. Then, a MPR cross-sectional image of the second image from the same view would be created. Again, a 2D-2D combination technique would be employed.

It should be appreciated that some applications may use an inverse intensity scheme, where low intensity values represent more significant information. In various embodiments of the present invention, MinIP imaging and the same combination schemes discussed above can be used.

Furthermore, in some applications the deviation from a specific value is relevant (e.g. in fMRI, low intensity values describe one significant outcome of the experiment, high intensity values describe another outcome). In this case, both projection techniques (MIP and MinIP) are applied and the more significant contribution is inserted into the combiner.

Although the examples mentioned in connection with the present invention involve combinations of 3D volumes, it should be appreciated that 4-dimensional (4D) or higher dimensional data could also be used without departing from the spirit and scope of the present invention.

As discussed, this invention is preferably implemented using a general purpose computer system. However the systems and methods of this invention can be implemented using any combination of one or more programmed general purpose computers, programmed microprocessors or microcontrollers, Graphics Processing Unit (GPU), and peripheral integrated circuit elements, ASIC or other integrated circuits, digital signal processors, hardwired electronic or logic circuits such as discrete element circuits, programmable logic devices such as a PLD, PLA, FPGA or PAL, or the like.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for visualizing a volume-volume fusion, comprising:
   a projector for creating a projected image using a first volume;
   a reformatter for creating a planar representation image using a second volume; and
   a combiner for fusing the projected image and the planar representation image, to create a composite image, where the projected image is a volume rendering (VR) image.

2. The system of claim 1, further comprising an output device for displaying the composite image.

3. The system of claim 1, wherein the first volume is a computed tomography (CT) volume.

4. The system of claim 1, wherein the second volume is a positron emission tomography (PET) volume.

5. The system of claim 1, wherein the first volume and the second volume are registered.

6. The system for visualizing a volume-volume fusion, comprising:
   a projector for creating a projected image using a first volume;
   a reformatter for creating a planar representation image using a second volume; and
   a combiner for fusing the projected image and the planar representation image, to create a composite image; wherein the projected image is one of a maximum intensity projection (MIP) image and a minimum intensity projection (MinIP) image.

7. The system for visualizing a volume-volume fusion, comprising:
   a projector for creating a projected image using a first volume;
   a reformatter for creating a planar representation image using a second volume; and
   a combiner for fusing the projected image and the planar representation image, to create a composite image; wherein the planar representation image is a multi-planer reformatted (MPR) image.

8. The system for visualizing a volume-volume fusion, comprising:
   a projector for creating a projected image using a first volume;
   a reformatter for creating a planar representation image using a second volume; and
   a combiner for fusing the projected image and the planar representation image, to create a composite image; wherein the composite image is one of a MPR-MIP overlay and a MPR-VR overlay.

9. A system for visualizing a volume-volume fusion, comprising:
   a first projector for creating a first projected image using a first volume;
   a second projector for creating a second projected image using a second volume; and
   a combiner for fusing the first projected image and the second projected image, to create a composite image, wherein the projected image is one of a maximum intensity projection (MIP) image and a minimum intensity Projection (MinIP) image.

10. The system of claim 9, further comprising an output device for displaying the composite image.

11. The system of claim 9, wherein the first volume is a computed tomography (CT) volume.

12. The system of claim 9, wherein the second volume is a positron emission tomography (PET) volume.

13. The system of claim 9, wherein the first volume and the second volume are registered.

14. The system of a system for visualizing a volume-volume fusion, comprising:
    a first projector for creating a first projected image using a first volume;
    a second projector for creating a second projected image using a second volume; and
    a combiner for fusing the first projected image and the second projected image, to create a composite image; wherein the projected image is a value rendering (VR) image.

15. The system of a system for visualizing a volume-volume fusion, comprising:
    a first projector for creating a first projected image using a first volume;
    a second projector for creating a second projected image using a second volume; and
    a combiner for fusing the first projected image and the second projected image, to create a composite image; wherein the planar representation image is a multi-planer reformatted (MPR) image, and the composite image is one of a MPR-MIP overlay and a MPR-VR overlay.

16. A method for visualizing a volume-volume fusion, comprising:
    creating a first image using a first volume;
    creating a second image using a second volume, the second image a projected image; and
    combining the first image and the second image, to create a composite image, wherein the second image is a volume rendering (VR) image.

17. The method of claim 16, wherein the first volume is a computed tomography (CT) volume.

18. The method of claim 16, further comprising the step of displaying the composite image.

19. The method of claim 16, wherein the first volume and the second volume are registered.

20. A method for visualizing a volume-volume fusion, comprising:
  creating a first image using a first volume;
  creating a second image using a second volume, the second image a projected image; and
  combining the first image and the second image, to create a composite image, wherein the second image is one of a maximum intensity projection (MIP) image and a minimum intensity projection (MinIP) image.

21. A method for visualizing a volume-volume fusion, comprising:
  creating a first image using a first volume;
  creating a second image using a second volume, the second image a projected image; and
  combining the first image and the second image, to create a composite image; wherein the first image is a multi-planar reformatted (MPR) image.

* * * * *